US006766423B2

(12) United States Patent
Mills et al.

(10) Patent No.: US 6,766,423 B2
(45) Date of Patent: Jul. 20, 2004

(54) MESSAGE-BASED MEMORY SYSTEM FOR DSP STORAGE EXPANSION

(75) Inventors: William Mills, Columbia, MD (US); Zoran Mladenovic, Bethesda, MD (US); Keith Krasnansky, Germantown, MD (US)

(73) Assignee: Telogy Networks, Inc., Germantown, MD (US)

( * ) Notice: Subject to any disclaimer, the term of this patent is extended or adjusted under 35 U.S.C. 154(b) by 36 days.

(21) Appl. No.: 10/043,254

(22) Filed: Jan. 14, 2002

(65) Prior Publication Data

US 2002/0144065 A1 Oct. 3, 2002

Related U.S. Application Data

(60) Provisional application No. 60/279,758, filed on Mar. 30, 2001.

(51) Int. Cl.[7] .............................................. G06F 13/00
(52) U.S. Cl. ......................... 711/147; 711/154; 712/35
(58) Field of Search ............................... 711/147, 154; 712/35

(56) References Cited

U.S. PATENT DOCUMENTS 5,497,373 A * 3/1996 Hulen et al. ................. 370/259
6,145,007 A * 11/2000 Dokic et al. ................. 709/230

OTHER PUBLICATIONS

Telogy Software Phase 2 oc3 High Density Development Platform Hardware Architecture Specification, Version Draft 1.1, May 26, 2001, pp. 1–20.
Telogy Software High Density Development Platform Phase 2 Packet Switch PLD Design Specification, Version Draft 1.20, Jan. 2, 2002, pp. 1–94.

* cited by examiner

Primary Examiner—Reba I. Elmore
(74) Attorney, Agent, or Firm—Warren L. Franz; W. James Brady; Frederick J. Telecky, Jr.

(57) ABSTRACT

A message-based memory system for Digital Signal Processor (DSP) storage expansion has a shared memory device connected to a number of DSPs through a packet communication bus. Each of the DSPs has a packet bus interface interconnected to the packet bus; and a messaging unit connected to the packet bus interface. The memory device interconnected to the packet bus can provide shared memory space for the DSPs to increase the amount of memory available to each DSP. The memory device can also be utilized to provide access to common information such as shared data or shared programing that may need to be run by multiple DSPs. The DSPs and the memory device communicate through the packet bus interface by generating packetized read and write requests.

20 Claims, 1 Drawing Sheet

MESSAGE-BASED MEMORY SYSTEM FOR DSP STORAGE EXPANSION

CROSS REFERENCE TO RELATED APPLICATIONS

This application claims priority to provisional patent 60/279,758 filed Mar. 30, 2001.

FIELD OF THE INVENTION

The invention relates to the communication of digital information, between multiple processors and a storage medium shared by these processors, using a packet bus. In particular, the invention provides the ability for the DSPs to store information to and retrieve information from a shared memory cache.

BACKGROUND OF THE INVENTION

Digital signal processors can include memory space on the processor itself. DSP's can also access memory external to the processor. When multiple DSP's are configured together, such as on a common circuit board or on a single piece of silicon, or are grouped for use by a common application or set of applications, it is not uncommon for the DSP's to access a common memory space. Access to a shared memory is typically accomplished through use of a separate processor for memory access control and a standard address bus and data bus arrangement.

Because of the ever increasing processing demands placed upon processors and the increasing restrictions on size, an increased need for memory space and memory access continues. For example, the DSPs of a VoIP system require access to a large amount of memory. Access can be provided directly through the host processor. Alternatively, due to the large number of DSPs that may reside in the signal processing farm, access to memory is preferably provided by a means that is independent of the host processor's internal resources, so that the host processor is not overly taxed. Prior art solutions have approached the problem in two ways: (1) by providing each DSP with its own external memory unit; and/or (2) by providing a highly complex bus arbitration unit that can arbitrate and resolve the conflicting requests of multiple DSPs attempting to access the data and address busses of a large memory unit simultaneously.

Providing each DSP with its own independent memory unit is undesirable due to the high cost. Also independent memory does not allow easy pooling or sharing of common programs or information storage. Utilizing a bus arbitration unit, although less costly in terms of memory, can also be undesirable due to the cost and complexity.

The need for increased processing and memory access is illustrated, for example, in packet-based voice communication which has evolved to enable a single network to deliver integrated voice and data services. Network build-out based on packet technology can support converged networks carrying both voice and data. Large scale VoP networks have become increasingly feasible as DSP-based technology has been refined to provide lower power and higher densities. Silicon and software technology for VoP has evolved to support high channel density on a single chip.

The ability to scale VoP networks to large volumes of traffic is critical to service providers justifying deployment of a packet-based infrastructure. Scalability requires VoP gateways to support very high volumes of traffic without degradation of voice quality. This places increased pressure on gateway vendors to support thousands of voice channels on a single platform.

High density VoP architectures are driven by the following critical elements:

1) Power per channel of the solution;
2) Cost per channel of the solution;
3) Channel density of the solution;
4) System partitioning, including packet aggregation and routing;
5) Software features that define the functionality of the product; and
6) Network management capabilities.

Of primary importance to the present invention are the channel density, system partitioning, and software features of the product. FIG. 1 illustrates a high density VoP module having numerous DSPs 3 that convert voice signals, provided by packet bus 4, to the appropriate format as they migrate between a Public Switched Telephone Network (PSTN) and a packet network. All of the packet communications are conveyed by packet bus 4. The DSPs 3 are controlled by a "host" processor 5 that is responsible for configuring and downloading software to the DSPs 3, as well as assisting in call establishment, call termination, and other network management functions.

In order to concentrate a large number of VoP channels, aggregation logic 9 is required to:

1) Aggregate packet streams from multiple DSPs 3 to the backplane/packet network interface via packet bus 4;
2) Route incoming packets from the backplane/packet network interface to the appropriate DSP 3 via packet bus 4;
3) Provide a standard interface to the backplane/packet network interface; and
4) Filter network management and call setup/tear-down information to the host processor.

Software is a critical ingredient of high quality VoP systems. There are many features that must be implemented for carrier class systems. The most important software features are:

1) Echo cancellation;
2) Voice compression;
3) Packet play-out;
4) Tone processing;
5) Facsimile and modem support;
6) Packetization;
7) Signaling support; and
8) Network management.

Because a DSP is flexibly reconfigurable through software, the particular function a DSP is performing at some instant in time may be dynamically controlled by the host processor. When assigned a particular function by the host processor, such as voice processing or facsimile, the DSP downloads a program overlay for executing the function. When assigned a different function, the DSP dynamically downloads and executes the program overlay for this function. These program overlays use large amounts of memory for their long-term storage.

All communication between memory unit 6 and the DSPs 3 is conveyed by processor 5, used in conjunction with aggregation logic 9. In this manner, the DSP's have only indirect communication with memory unit 6, conveyed through aggregation logic 9 and the host processor 5. When an indirect communication occurs, the host processor 5 must defer other pending operations to make the transfer.

High quality converged or integrated voice and data over packet V/DoP systems typically include a hardened line echo canceller that can properly cancel echo this can require significant memory space. Tone processing is essential for call setup and termination as well as handling in-call user functions, such as voice mail, credit card calls, etc. Standard voice announcements that need large amounts of memory are used in conjunction with the tone processing features. Also fundamental to any communication system is the need to discover, isolate, and remedy problems as quickly as possible, to minimize or eliminate the impact to users of the system. An ability to store diagnostic trace information for each DSP channel would greatly improve the performance and, thereby, the network management of the packet system. All of these features place high demands on the memory requirements of a packet system.

SUMMARY OF THE INVENTION

The present invention overcomes the memory access shortcomings of the prior art by providing a DSP memory cache connected to the packet bus. The DSP memory cache can be accessed directly by each of the DSP's. Each DSP processor can request specific information from memory and can request information from specific memory locations. Requests for stored information are generated by a message unit that is internal to each DSP and are communicated over a packet bus to the shared memory device. The memory device can act upon the requests in the order in which they are received or can act according to a message priority. The requested information is sent to the requesting processor by a number of reply packets.

The DSPs communicate with the stored memory using the same packet format that is used to communicate with the network. This eliminates the need for a separate communication interface for the DSP and allows normal generation of packets which are written to memory and allows retrieval of voice playout to the network without additional CODEC processing.

A message-based memory system for Digital Signal Processor (DSP) storage expansion is disclosed, having: a packet communication bus; a number of DSPs each having a packet bus interface interconnected to the packet bus and a DSP message unit for generating packetized read and write requests to a memory device; and a memory device interconnected to the packet bus by a packet bus interface.

BRIEF DESCRIPTION OF THE DRAWINGS

Preferred embodiments of the invention are discussed hereinafter in reference to the drawings, in which.

DETAILED DESCRIPTION OF THE INVENTION

Figure 1:
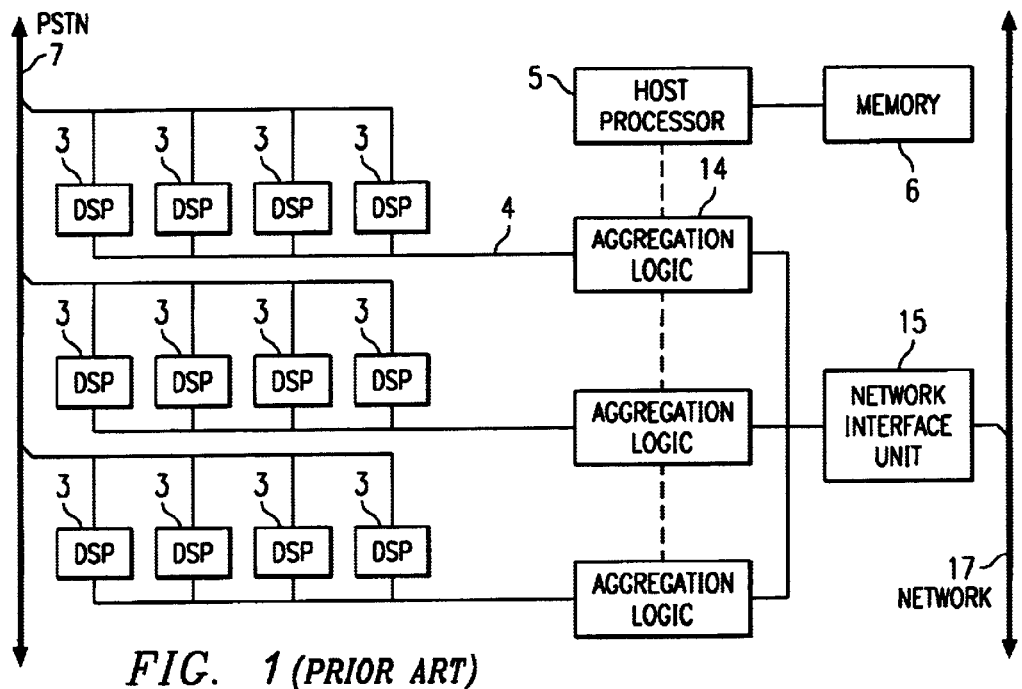
FIG. 1 is a prior art diagram illustrating a portion of a high density voice/data over packet processing module having numerous DSPs that convert voice, fax and/or data signals to the appropriate format as they migrate between a Public Switched Telephone Network (PSTN) and a packet network.
Figure 2:
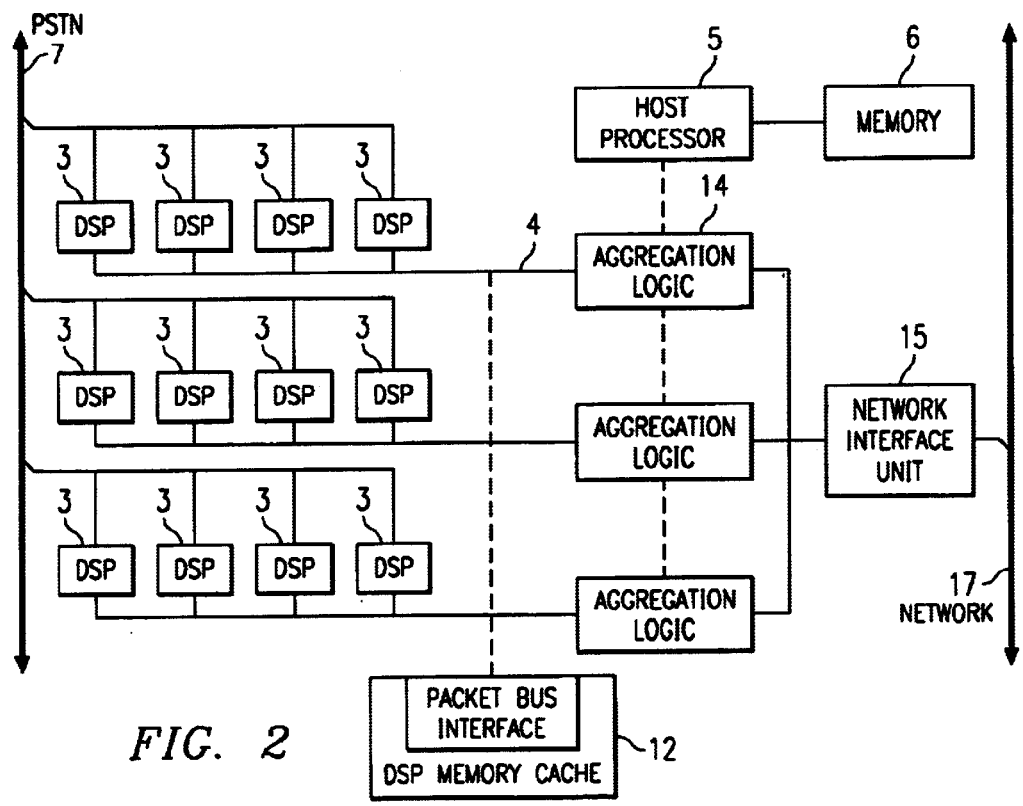
FIG. 2 is a diagram of an exemplary embodiment of the present invention, illustrating a portion of collection of DSP's with a shared memory cache.

Referring now to FIG. 2, a portion of a V/DoP system is illustrated. This system has multiple DSPs 3 connected to a PSTN 7. A packet bus 4 interconnects each of the DSPs 3 with a DSP memory cache 12 and with aggregation logic 14. Aggregation logic 14 is connected to network 17 through network interface unit 15. The host processor 5 and its associated memory 6 are also connected to the packet bus 4 through aggregation logic 14. Processor 5 can continue to allow access to its memory 6, a in the prior art, however, DSPs 3 also have access to shared memory cache 12 as taught herein by the present invention. Each DSP has a packet bus interface to interconnect the DSP to the packet bus 4. Each DSP also has a messaging unit for facilitating access to shared DSP memory cache 12.

Packet bus 4 serves a dual purpose. First, it provides a medium for communicating the packet network-formatted information between the aggregation logic 14 and the DSPs 3. Second, the packet bus 4 provides a medium for communicating information between the DSP memory cache 12 and the DSPs 3. In the exemplary embodiment, information is communicated by the packet bus 20.

Occasionally, a DSP will generate a substantial amount of data that must be temporarily stored. Additionally, a DSP may have use for large stores of data or program code not created by the DSP. In either case, when this amount of data exceeds the internal storage capacity of the DSP, the data must be stored externally. The present invention provides a system having a shared cache of memory 12 that is made available to multiple DSPs 3.

In one embodiment, each DSP 3 has a packet bus interface that supports direct communication with the packet bus interface of the shared memory cache 12. Packet bus 4 provides the DSPs 3 with access to the memory cache 12. With this system, the DSP need not burden the host processor 5 to gain access to an external memory 6. Similarly, there is no need to integrate a complicated and expensive bus arbitration circuit to control access to a shared memory. The DSP's packet bus interface generates read, write, modify, and conditional write commands (i.e., multiprocessor semaphores) in a packetized format that is appropriate for conveyance across the packet bus 4. When these packetized commands are received by the shared memory cache's packet bus interface, the commands are removed from the data packets and executed. The memory cache 12 responds to a command instructing it to write information to an addressed memory space by executing the command and optionally replying to the DSP with a packetized acknowledgment. The acknowledgment response is sent to the DSP that generated the command, using packet bus 4. Commands instructing the cache 12 to retrieve data from memory cause the cache to read the data from the identified memory space, packetize the data, and send the data to the DSP using the packet bus 20.

As an exemplary use of the shared memory cache 12, the cache can be used to construct one or more delay lines. The delay line can be implemented by dividing a portion of the memory space into multiple logical FIFO buffers, one for each delay line channel. Each logically constructed FIFO is assigned to a separate one of the DSP cores performing the echo cancellation operation on a voice channel. As a DSP receives packets containing portions of the compressed voice signal, it stores these packets in their proper sequential order to the FIFO. To accomplish this, the DSP sends the information to be stored to its packet bus interface. The packet bus interface assembles the information into a packet with an instruction for the memory cache 12 to store the information. The packet is sent to the memory cache's packet bus interface over packet bus 4. The memory cache 12 interprets the instruction to write the information to memory and executes this instruction by writing the information to the head of the assigned FIFO.

The DSP may retrieve these packets from the FIFO in the order in which they were stored. To accomplish this, the DSP uses its packet bus messaging unit and packet bus interface to format a packetized read instruction. The packetized instruction is communicated to the packet bus interface of the memory cache 12 by packet bus 4. Memory cache 12 interprets the instruction and executes it by retrieving the next piece of information from the tail of the FIFO buffer. The retrieved information is packetized by packet bus interface of the memory cache 12 and communicated to the DSP's packet bus interface. The packet bus interface for the DSP removes the requested pieces of information from the received packets and provides them to the DSP 3 in their proper order. A read instruction of this type can be generated by the DSP 3 one processing cycle before the requested information is needed, to pre-fetched the data for the next processing cycle.

In a second exemplary use of the invention, a DSP is configured to reproduce the speech characteristics of standardized announcement messages. Numerous announcements may be stored in memory in a digital format for later retrieval and generation of the announcement speech. Since the digital representation of an announcement speech requires a large amount of memory and many standardized announcements may be used by multiple DSPs 3, a large and shared memory cache is better suited to the application than individual memory units that are each used exclusively by a single DSP. A shared memory cache only needs to keep a single copy of each announcement and this copy may be retrieved by every DSP that shares the memory cache. On the other hand, if each of the DSPs has exclusive use of a memory unit, then each memory unit must store a copy of every announcement that its associated DSP may potentially use.

In this second example, the DSP stores a list of announcements and the voice and memory parameters of each announcement. Voice parameters include the CODEC type, CODEC rate, and CODEC protocol. The memory parameters include the block address and the number of blocks containing the digitized representation of the announcement. To generate an announcement message, the DSP 3 issues a read request to the memory cache 12 that identifies the chosen announcement. Communication between the DSP 3 and the memory cache 12 occurs over packet bus 20 in the manner described previously. Identifying the chosen announcement may be done by way of indexing or by specifying the beginning address and length of the message. The DSP memory cache 12 receives the request and executes the packetized instruction. The voice packets corresponding to the identified announcement are communicated back to the DSP 3 as packets over the packet bus 4. The DSP plays out the voice packets as it would handle packets from the network. The DSP 3 can issue a read request for an announcement one processing cycle before it is needed.

In a third exemplary use of the invention, voice mail and other recording services may be performed. In this example, the retrieval of stored voice and other recorded messages is conducted in the same manner as that described, above, for the retrieval of standardized announcement messages. The DSP can be configured with information about the available memory for storage of voice messages, such as the memory address and maximum message size. The DSP generates voice packets for the voice message using it standard voice packet generation but generates write requests to store the packets in the memory cache 12 instead of generating the packets to the network. To store a message, the DSP 3 issues a write command to the memory cache 12 that identifies the message. The memory cache can return a packet identifying the message and its memory space within the memory cache where the information is stored. The write command is packetized by the packet bus interface and communicated to the memory cache 12 by packet bus 4. DSP memory cache 12 receives the packetized command and executes it by storing the communicated portion of the digitized message. The recorded message can be used with the announcement service or accessed by the host 5 for manipulation, long term storage or transfer to another application such as e-mail.

In a fourth exemplary use of the invention, diagnostic information generated by a DSP may be stored to the shared memory cache 12. As the information is generated, the DSP generates write requests to the memory cache 12. Later, the host processor 5 may access the stored information for use in analyzing the performance of the DSP or to communicate it to another device, or transfer it to another application.

In a fifth exemplary use of the invention, information that changes infrequently, such as program overlays, parameter values and constant data may be stored in the memory cache 12 for use by the DSPs 3. The host 5 can configure the DSP's with details of the information, such as programs and data, stored in the cache 12. The DSP can generate a read command when the information is needed, in the manner described above. A DSP can operate in more than one configuration by changing its program overly. The program overlays stored in the cache 12 can be used to overwrite a current program overlay on a DSP with a different overlay. For example, a DSP which is configured for voice processing can be used for data processing by swapping a voice processing program overlay for a data processing program overlay.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A message-based memory system for processor storage expansion, comprising:
    a packet communication bus;
    a shared memory device, interconnected to said packet communication bus by a shared memory device packet bus interface, that shares a memory with a number of processors,
    said number of processors each comprising:
        a processor packet bus interface, interconnected to said packet communication bus, and
        a processor messaging unit for generating packetized read and write requests for communication with said shared memory device through said processor packet bus interface,
    wherein, when said packetized read and write requests are received by said shared memory device packet bus interface, the requests are removed from the read and write packets and executed by the shared memory device.

2. The system of claim 1, wherein:
    said memory device stores operational programming for distribution to one or more of said processors.

3. The system of claim 1, further comprising:
    a host processor operatively connected to said packet bus, wherein said processors write diagnostic information to said shared memory device; and
    said shared memory device is used to store said diagnostic information accessible to said host processor.

4. The system of claim 1, wherein said processor packet bus interface from each of said processors is directly connected to said shared memory device packet bus interface.

5. The system of claim 1, wherein, said packetized read and write requests are executed by the shared memory device without a bus arbitration to control access of said number of processors to said shared memory device.

6. The system of claim 1, wherein:

said packet bus is further connected to a network for the receipt and transmission of voice over packet information.

7. The system of claim 6, further comprising:

a host processor operatively connected to said packet bus, wherein said shared memory device is used to store voice messages accessible to each of said processors and said host processor.

8. The system of claim 7, wherein:

said shared memory device is used to store announcement messages available to each of said processors.

9. The system of claim 8, wherein:

said host processor supplies a list of stored announcement messages including message parameters and access locations to each of said processors.

10. The system of claim 1, wherein:

said shared memory device packet bus interface has a memory messaging unit for generating packetized acknowledgment messages in response to said write requests and generating packetized data messages containing information requested by said read requests.

11. The system of claim 10, wherein:

said read requests, write requests, acknowledgment messages, and data messages are communicable over said packet communication bus using data packets.

12. The system of claim 11, wherein:

said processor messaging unit supports modify and conditional-write multiprocessor semaphores.

13. The system of claim 11, wherein:

each of said number of processors independently processes a separate communication signal;

a memory space of said shared memory device is logically divided into multiple first-in first-out (FIFO) memories; and each of said number of processors uses one of said multiple FIFOs exclusively.

14. The system of claim 13, wherein:

each of said number of processors writes information only to a head-end of an addressed one of said multiple FIFOs and reads information only from a tail-end of said addressed one of said multiple FIFOs.

15. A message-based memory system for DSP storage expansion, comprising:

a packet communication bus;

a number of DSPs each comprising a DSP packet bus interface interconnected to said packet communication bus; and a shared memory device, interconnected to said packet bus by a memory device packet bus interface, that shares a memory with said number of DSPs, wherein said DSP packet bus interface comprises a DSP messaging unit for generating packetized read and write requests to said shared memory device, and when said packetized read and write requests are received by said shared memory device packet bus interface, the requests are removed from the read and write packets and executed by the shared memory device.

16. The system of claim 15, wherein:

said memory device packet bus interface has a memory messaging unit for generating packetized acknowledgment messages in response to said write requests and generating packetized data messages containing information requested by said read requests.

17. The system of claim 16, wherein:

said read requests, write requests, acknowledgment messages, and data messages are communicable over said packet communication bus using data packets.

18. The system of claim 15, wherein said DSP packet bus interface from each of said DSPs is directly connected to said shared memory device packet bus interface.

19. The system of claim 15, wherein, said packetized read and write requests are executed by the shared memory device without a bus arbitration to control access of said DSPs to said shared memory device.

20. A message-based memory system for processor storage expansion, comprising:

a packet communication bus;

a shared memory device, interconnected to said packet communication bus by a shared memory device packet bus interface, that shares a memory with a number of processors, said number of processors each comprising:

a processor packet bus interface, interconnected to said packet communication bus, and a processor messaging unit for generating packetized read and write requests for communication with said shared memory device through said processor packet bus interface, wherein said shared memory device packet bus interface has a memory messaging unit for generating packetized acknowledgment messages in response to said write requests and generating packetized data messages containing information requested by said read requests, said read requests, write requests, acknowledgment messages, and data messages are communicable over said packet communication bus using data packets, and said processor messaging unit supports modify and conditional-write multiprocessor semaphores.

* * * * *